Figure 1:
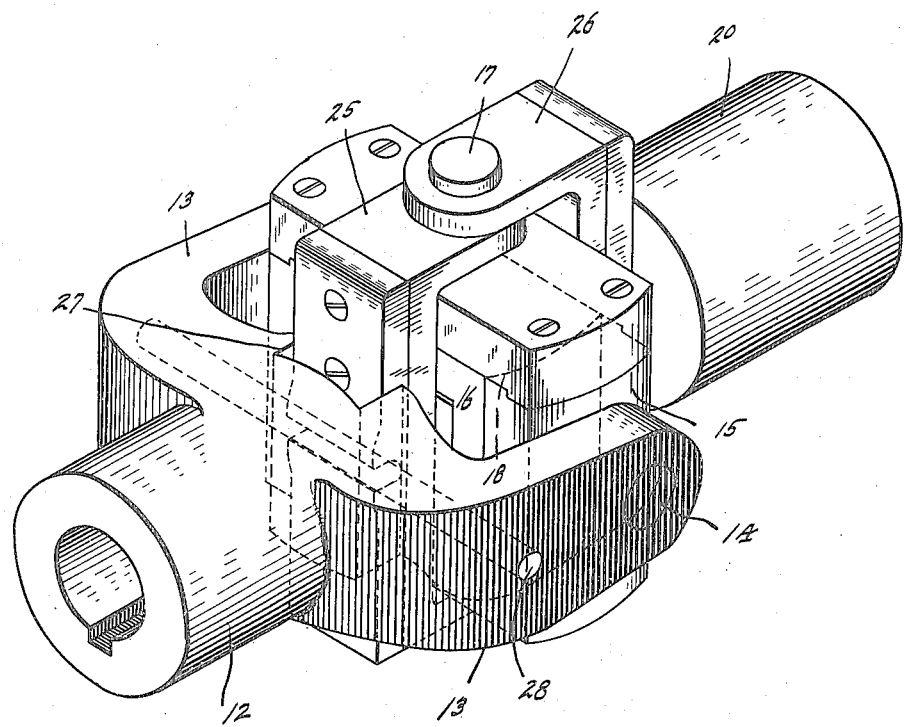

G. M. BARTLETT.
UNIVERSAL JOINT.
APPLICATION FILED SEPT. 11, 1913.

1,180,468.

Patented Apr. 25, 1916.
2 SHEETS—SHEET 1.

WITNESSES:
Frank A. Fahle
Josephine Gasper

INVENTOR
George Miller Bartlett,
BY
Arthur M. Hood
ATTORNEY

G. M. BARTLETT.
UNIVERSAL JOINT.
APPLICATION FILED SEPT. 11, 1913.
1,180,468.
Patented Apr. 25, 1916.
2 SHEETS—SHEET 2.
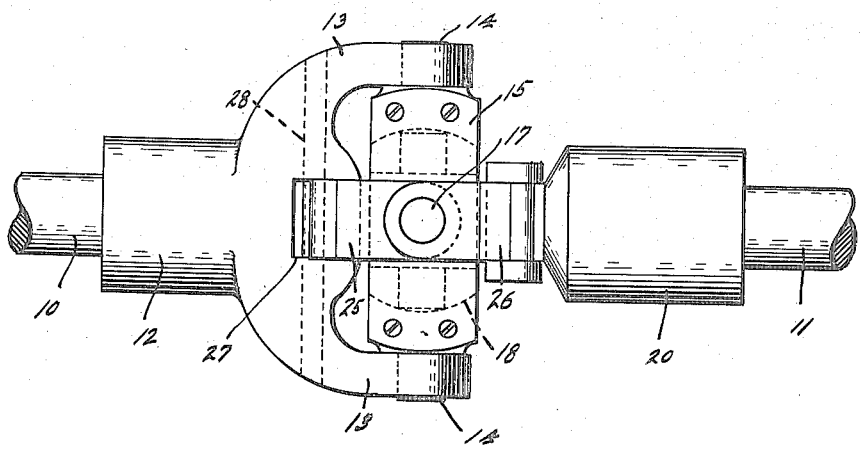
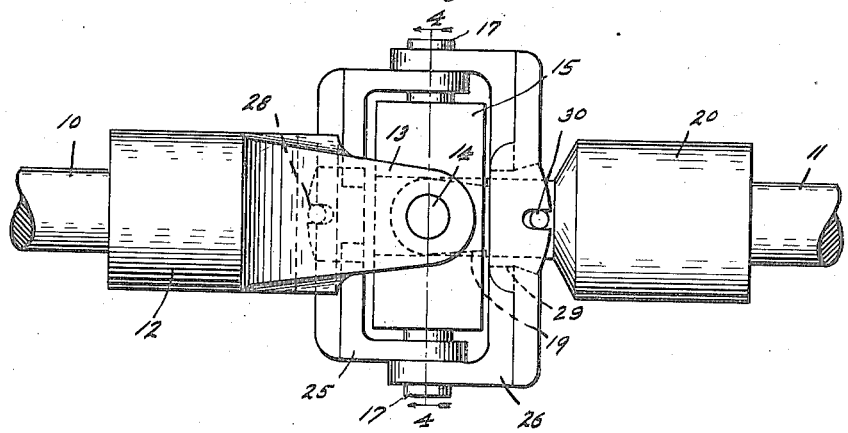
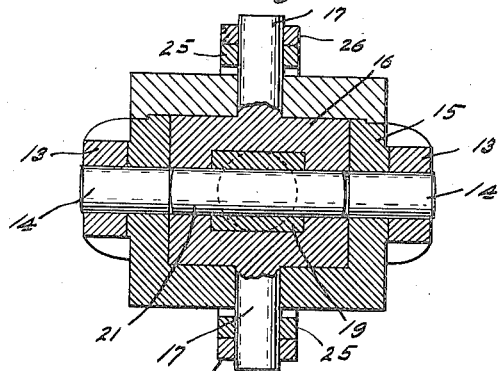
WITNESSES:
Frank A. Fahle
Josephine Gasper
INVENTOR
George Miller Bartlett,
BY
Arthur M. Hood
ATTORNEY

UNITED STATES PATENT OFFICE.

GEORGE MILLER BARTLETT, OF INDIANAPOLIS, INDIANA.

UNIVERSAL JOINT.

1,180,468.

Specification of Letters Patent.  Patented Apr. 25, 1916.

Application filed September 11, 1913.  Serial No. 789,289.

*To all whom it may concern:*

Be it known that I, GEORGE MILLER BARTLETT, a citizen of the United States, residing at Indianapolis, in the county of Marion and State of Indiana, have invented a new and useful Universal Joint, of which the following is a specification.

It is the object of my invention to provide a simple, compact, and strong universal joint by which the movement of the driven shaft may be at all times proportional to that of the driving shaft, which is not the case in the universal joints in common use.

The accompanying drawings illustrate one embodiment of my invention.

In these drawings, Figure 1 is a perspective view of the universal joint in its entirety; Fig. 2 is a side elevation of the universal joint shown in Fig. 1; Fig. 3 is a similar side elevation with the shafts rotated 90°; and Fig. 4 is a section on the line 4—4 of Fig. 3.

The universal joint is to connect the two shafts 10 and 11, which may be out of alinement. On the shaft 10 is suitably mounted a collar 12 which in reality forms the end of the shaft 10, and this collar is provided with a pair of separated arms 13. The arms 13 are perforated perpendicularly to the axis of the shaft 10 to form a bearing for a pair of pivot pins 14 carrying a frame 15 located between the two arms 13, so that such frame is movable relatively to the shaft 10 and collar 12 about an axis perpendicular to the axis of the shaft 10. The frame 15 is made in two parts, for purposes of assembling. A member 16 is mounted within the frame 15 so that it can move relatively thereto about an axis perpendicular to the axis about which the frame 15 is movable relatively to the arms 13, this pivotal mounting being secured in the arrangement shown by arranging the outer surface of the member 16 to fit against the inner surface of the frame 15 on a segment of a surface of revolution, here shown as a portion of a cylinder 18, having such axis, the two parts 15 and 16 also meeting on plane surfaces perpendicular to such axis and bounding the surface of revolution; if desired, either the member 16 or the frame 15 may also be provided with pivot pins 17 which have a rotatable fit in holes in the other of such parts, such axis also being the axis of such pins and holes. Within the member 16 the end of a projection 19 from a collar 20 mounted on the shaft 11 and in reality forming the end thereof is mounted to rotate on an axis perpendicular to the axis of the shaft 11 and to the axis of the pins 17 and cylinder 18, this mounting being provided by a pin 21 which extends through the projection 19 and into holes in the member 16 and is perpendicular to the pins 17 and the shaft 11.

The pivot pins 17 are extended beyond the outer surface of the frame 15 to provide pivotal bars for two yokes 25 and 26, each of which is pivoted on both pivot pins 17 and one of which has its two arms located outside of but with a sliding fit against the two arms of the other, and the two arms of this other being spaced farther apart than the distance between the outer surfaces of the frame 15 from which the pivot pins 17 project, so that there is a clearance between the arms of this yoke and the frame 15 when the two shafts 10 and 11 are in alinement. Each of these yokes is shown as made of several parts for convenience in assembling. The yoke 25 has a sliding fit in a slot 27 in the end of the collar 12 and between the two arms 13, and is notched at its center to have a sliding fit over a pin 28 extending through the collar 12 on a line parallel to the axis of the pins 14 and perpendicular to the axis of the shaft 10. This allows the yoke 25 to slide in the slot 27 over the pin 28 and also to swing about the axis of the pin 28. The yoke 26 is perforated at 29 to allow the projection 19 to pass through it, such projection having a sliding fit within the perforation 29; and the yoke 26 is notched at its center to have a sliding fit over a pin 30 extending through the projection 19 on a line parallel to the axis of the pin 21 and perpendicular to the axis of the shaft 11. This allows the yoke 26 to slide on the projection 19 over the pin 30 and also to swing about the axis of the pin 30.

The axes of the shafts 10 and 11, of the pivot pins 14, 17, and 21, and of the surface of revolution 18 all intersect at a common point, from which point the pins 28 and 30 are equidistant. By this arrangement the axes of the shafts 10 and 11 may be at an angle to each other, and the shafts rotated, and the plane in which the pins 17 are rotated is at equal angles to the axes of the two shafts. As a result, the angular movement of one shaft is at all times proportional to that of the other. This action is readily apparent from Fig. 3, which indicates clearly that if one of the shafts, say the shaft 11, is turned downward about its pivotal connection with the universal joint, which is about the axis of the pin 21, the yoke 26 is also carried downward by reason of the engagement of its notch with the pin 30 and the upper arm of such yoke pushes downward on the upper arm of the yoke 25; but as the yoke 25 cannot move downward in its entirety, it swings about the axis of the pin 28, thus forcing the yoke 26 to swing about the axis of the pin 30, the yokes also sliding axially of the collars 12 and 20 to some extent, and by such turning of the two collars, the axis of the pin 17 is turned through an angle which is half that through which the shaft 11 is turned as the shafts are rotated, and the pins 17 move in a plane which is at equal angles to the axes of the shafts 10 and 11.

I claim as my invention:—

1. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of coaxial surfaces of revolution and on plane surfaces perpendicular to the axis of and intersecting such surfaces of revolution, the common axis of the engaging surfaces of revolution on the first and second members being perpendicular to a plane containing the aforesaid two pivotal axes, any open space between different parts of said segments extending less than 180° about the axis of said surfaces of revolution, and means for maintaining at equal angular distances from the axes of the two shaft ends the plane in which the axis of said surfaces of revolution moves as the shaft ends are rotated.

2. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of co-axial surfaces of revolution, the common axis of the engaging surfaces of revolution on the first and second members being perpendicular to a plane containing the aforesaid two pivotal axes, and means for maintaining at equal angular distances from the axes of the two shaft ends the plane in which the axis of said surfaces of revolution moves as the shaft ends are rotated.

3. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of co-axial surfaces of revolution, the common axis of the engaging surfaces of revolution on the first and second members being perpendicular to a plane containing the aforesaid two pivotal axes.

4. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other in segments of co-axial surfaces of revolution, the common axis of the engaging surfaces of revolution on the first and second members being perpendicular to a plane containing the aforesaid two pivotal axes, any open space between different parts of said segments extending less than 180° about the axis of said surfaces of revolution, and means for maintaining at equal angular distances from the axes of the two shaft ends the plane in which the axis of said surfaces of revolution moves as the shaft ends are rotated.

5. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of co-axial surfaces of revolution, the common axis of the engaging surfaces of revolution on the first and second members being perpendicular to a plane containing the aforesaid two pivotal axes, any open space between different parts of said segments extending less than 180° about the axis of said surfaces of revolution.

6. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of co-axial surfaces of revolution and on plane surfaces perpendicular to the axis of and intersecting such surfaces of revolution, the common axis of the engaging surfaces of revolution on the first and second members being perpendicular to a plane containing the aforesaid two pivotal axes, and means for maintaining at equal angular distances from the axes of the two shaft ends the plane in which the axis of said surfaces of revolution moves as the shaft ends are rotated.

7. In combination, two shaft ends, a member pivotally mounted within one of such shaft ends and movable relatively thereto about an axis perpendicular to and intersecting the axis of said shaft end, a second member within which the other shaft end is pivotally mounted to move relatively thereto about an axis perpendicular to and intersecting the axis of said other shaft end, said first member being hollow and said second member fitting within the first member, said first and second members engaging each other on segments of co-axial surfaces of revolution and on plane surfaces perpendicular to the axis of and intersecting such surfaces of revolution, the common axis of the engaging surfaces of revolution on the first and second members being perpendicular to a plane containing the aforesaid two pivotal axes.

In witness whereof, I, have hereunto set my hand at Indianapolis, Indiana, this fourth day of September, A. D. one thousand nine hundred and thirteen.

GEORGE MILLER BARTLETT.

Witnesses:
FRANK A. FAHLE,
JOSEPHINE GASPER.